(12) United States Patent
Kim

(10) Patent No.: US 7,322,281 B2
(45) Date of Patent: Jan. 29, 2008

(54) OVERHEAT PREVENTION DEVICE FOR HOUSEHOLD BEAN MILK AND BEAN CURD MAKERS

(76) Inventor: Hong-bae Kim, 5-7, Hyunchen-dong, Dukyang-ku, Koyang-city, Kyunggi-do (KR)

( * ) Notice: Subject to any disclaimer, the term of this patent is extended or adjusted under 35 U.S.C. 154(b) by 357 days.

(21) Appl. No.: 10/897,419

(22) Filed: Jul. 23, 2004

(65) Prior Publication Data

US 2005/0057876 A1    Mar. 17, 2005

(30) Foreign Application Priority Data

Jul. 24, 2003    (KR)    .................. 20-2003-0023909

(51) Int. Cl.
*A47J 43/044*    (2006.01)
*A23L 1/20*    (2006.01)

(52) U.S. Cl. .................. 99/348; 99/282; 99/286; 99/331; 99/333; 99/338; 99/510

(58) Field of Classification Search .................. 99/348, 99/331, 333, 338, 281, 285, 286, 288, 323.3, 99/341, 510
See application file for complete search history.

(56) References Cited

U.S. PATENT DOCUMENTS

| | | |
|---|---|---|
| 360,485 A | 4/1887 | Smith |
| 2,980,099 A | 4/1961 | Klemm |
| 3,683,153 A * | 8/1972 | Heyer .................. 392/403 |
| 4,059,016 A | 11/1977 | Kitzinger et al. |
| 4,203,099 A | 5/1980 | Edwards |
| 4,205,237 A | 5/1980 | Miller |
| 5,013,158 A | 5/1991 | Tarlow |
| 5,201,263 A | 4/1993 | Teng |
| 5,404,803 A * | 4/1995 | Glucksman .................. 99/473 |
| 5,446,444 A | 8/1995 | Lease |
| 5,487,359 A | 1/1996 | Montreuil |
| 5,516,208 A | 5/1996 | Givant |
| 5,588,353 A * | 12/1996 | Glucksman et al. .......... 99/348 |
| 5,600,997 A | 2/1997 | Kemp et al. |
| 5,699,239 A | 12/1997 | Komori |
| 5,852,965 A | 12/1998 | Kim |
| 5,936,356 A | 8/1999 | Brault |
| 5,980,099 A | 11/1999 | Soon |
| 6,232,883 B1 | 5/2001 | Silva et al. |
| 6,247,393 B1 | 6/2001 | Chang |
| 6,248,978 B1 | 6/2001 | Okuda |
| 6,345,572 B1 | 2/2002 | Kao |
| 6,353,208 B1 * | 3/2002 | Bostic et al. ................ 219/387 |

(Continued)

*Primary Examiner*—Reginald L. Alexander
(74) *Attorney, Agent, or Firm*—Shlesinger, Arkwright & Garvey LLP

(57) ABSTRACT

Overheat prevention device for household bean milk and bean curd makers is disclosed. Such makers include a housing having a cavity to contain water therein, a main body, and a drive motor to rotate a cutting blade on an end of a drive shaft. A heater may be provided which generates heat when electricity is applied to the heater, thus heating an interior of the housing. Overheat prevention device includes a temperature sensing and fusing bar extending to a predetermined length to reach a position around the filter net and has a temperature sensor to detect an internal temperature of the housing, and a thermal fuse to cut off electricity supplied to the heater, when the interior of the housing overheats. Overheat prevention device allows the thermal fuse to accurately detect an internal temperature of the housing, therefore preventing the bean milk and bean curd maker from overheating.

4 Claims, 2 Drawing Sheets

U.S. PATENT DOCUMENTS

| | | |
|---|---|---|
| 6,647,863 B2 * | 11/2003 | Lang .......................... 99/287 |
| 6,653,941 B2 | 11/2003 | Kim |
| 6,688,214 B1 | 2/2004 | Kikuchi et al. |
| 6,703,723 B2 | 3/2004 | Kim |
| 6,792,849 B1 | 9/2004 | Kim |
| 6,796,220 B2 | 9/2004 | Lee |
| 6,860,193 B1 | 3/2005 | Kim |

* cited by examiner

OVERHEAT PREVENTION DEVICE FOR HOUSEHOLD BEAN MILK AND BEAN CURD MAKERS

CROSS-REFERENCE TO RELATED APPLICATIONS

This application claims the priority of Korean application no. 2003-23909, filed Jul. 24, 2003, which is incorporated herein by reference.

This application relates to concurrently filed U.S. application Ser. No. 10/897,421, filed Jul. 23, 2004; and this application relates to U.S. application Ser. No. 10/131,460, filed Apr. 25, 2002, now U.S. Pat. No. 6,653,941, issued Nov. 25, 2003, and this application relates to U.S. application Ser. No. 10/131,192, filed Apr. 25, 2002, now U.S. Pat. No. 6,703,723, issued Mar. 9, 2004.

FIELD OF THE INVENTION

The present invention relates generally to household bean milk and bean curd makers, and more particularly, to an overheat prevention device for the household bean milk and bean curd makers, which is constructed so that a thermal fuse is installed in a temperature sensing bar, and the temperature sensing bar is maximally lengthened to be near to a heater, thus allowing the thermal fuse to accurately detect an internal temperature of a housing, therefore preventing the household bean milk and bean curd makers from overheating.

BACKGROUND OF THE INVENTION

The process of making bean milk and bean curd using a traditional method is as follows.

First, beans are washed, and the washed beans are soaked in water for many hours. The soaked beans are ground by a mill or a blender to obtain an extract of beans. The extract of beans is strained through a sieve or closely perforated cloth to be divided into bean curd dregs and an extract of protein.

Next, only the extract of protein is put into a vessel, such as a pot, and boiled. At this time, the extract of protein may boil over. Thus, in order to prevent the extract of protein from boiling over, heating power must be carefully regulated by a user. After the extract of protein is boiled for a predetermined period, additives, including sugar and salt, are added to the extract of protein. Thus, the bean milk is finished.

Meanwhile, when the user desires to make watery bean curd or bean curd, a coagulant, such as calcium sulphate, is stirred into the boiled extract of protein. After several minutes, the watery bean curd is made. Further, when the watery bean curd is pressed in a frame to have a predetermined shape, the bean curd is made.

However, the conventional method of making bean milk and bean curd has a problem in that several processes are individually executed, thus it is inconvenient and complicated to make the bean milk and the bean curd, and it takes longer time to make the bean milk and the bean curd, thereby the conventional method is inefficient.

In order to solve the problems, there have been proposed various devices for easily and conveniently making bean milk and bean curd at home. For example, there are Korean Patent No. 99-225772, Korean Patent No. 2000-228659, Korean U.M. Registration No. 158856, Korean U.M. Registration No. 250843, etc, that are disclosed by the applicant of the present invention. The Korean Patent No. 99-225772 was published on Oct. 15, 1999, and is titled "household bean curd maker". The Korean Patent No. 2000-228659 was published on Mar. 15, 2000, and is titled "household bean curd maker". The Korean U.M. Registration No. 158856 was registered on Jul. 16, 1999, and is titled "household bean curd maker". The Korean U.M. Registration No. 250843 was registered on Oct. 5, 2001, and is titled "household bean curd maker with fixed-type blade unit".

A conventional household bean milk and bean curd maker will be described in the following with reference to FIG. 1.

FIG. 1 is a sectional view of the conventional household bean milk and bean curd maker. As shown in FIG. 1, the conventional household bean milk and bean curd maker includes a housing 11 which has a cavity to contain water therein. A main body 12 is provided on an upper portion of the housing 11 to open or close the housing 11, like a lid. A drive motor 13 is installed in a predetermined portion of the main body 12, and generates rotating power when electricity is applied to the drive motor 13. A drive shaft 14 transmits the rotating power from the drive motor 13. A cutting blade 15 is provided at an end of the drive shaft 14. A heater 16 downwardly extends from the main body 12, and generates heat when electricity is applied to the heater 16, thus heating an interior of the housing 11. A temperature sensing bar 17 detects the temperature of the interior of the housing 11. A filter net 18 is detachably mounted to a predetermined portion of the main body 12, and contains beans therein. Further, the household bean milk and bean curd maker also includes a thermal fuse 19 coupled to a predetermined portion of the heater 16, thus preventing the electricity from being supplied to the heater 16 when the housing 11 is overheated.

The conventional household bean milk and bean curd maker constructed as described above is operated as follows.

First, a user puts the beans into the filter net 18. The filter net 18 containing the beans is assembled with the main body 12, and then water is put into the housing 11. Thereafter, the main body 12 is placed on the upper portion of the housing 11 so that the filter net 18 is put into the housing 11.

Next, when a power switch (not shown) is turned on to apply electricity to the household bean milk and bean curd maker, a control unit (not shown) outputs a control signal to operate the heater 16 and the temperature sensing bar 17. At this time, a primary heating process is executed while maintaining a predetermined temperature. Thereafter, as the drive motor 13 is operated, the beans contained in the filter net 18 are ground by the cutting blade 15 provided at the end of the drive shaft 14.

As such, while the beans are ground, the turbulence of water contained in the housing 11 is caused by rotation of the cutting blade 15. By the turbulence, bean grains which are finely ground by the cutting blade 15 come out of the filter net 18. Thus, the beans ground by the cutting blade 15 are divided into bean-curd dregs which remain in the filter net 18, and the extract of protein which flows out of the filter net 18.

Thereafter, the control unit (not shown) outputs a control signal to operate the heater 16 and the temperature sensing bar 17. At this time, a secondary heating process is executed while maintaining a predetermined temperature. Through the above-mentioned process, bean milk is obtained.

When the user desires to make bean curd, the user takes the heated extract of protein out of the housing 11. Next, the coagulant is added to the heated extract of protein so as to coagulate the extract of protein. Thereafter, the coagulated protein is pressed in the frame to produce the bean curd.

In such a household bean milk and bean curd maker, the thermal fuse 19 serving as the overheat prevention device is coupled to the heater 16. Thus, when the housing 11 is overheated during making the bean milk and bean curd, the thermal fuse 19 is electrically opened, thus preventing electricity from being supplied to the heater 16, and thereby protecting the user from an electric shock.

However, the conventional overheat prevention device for the household bean milk and bean curd maker has a problem in that the thermal fuse 19 does not detect the internal temperature of the housing 11 but detects the temperature of the heater 16 positioned in the main body 12, so that the internal temperature of the housing 11 is not accurately detected, thus causing the household bean milk and bean curd maker to overheat.

OBJECTS AND SUMMARY OF THE INVENTION

An object of the invention is to overcome the drawbacks of the prior art.

Accordingly, the present invention has been made keeping in mind the above problems occurring in the prior art, and an object of the present invention is to provide an overheat prevention device for household bean milk and bean curd makers, which is constructed so that a thermal fuse is installed in a temperature sensing bar, and the temperature sensing bar is maximally lengthened to be near to a heater, thus allowing the thermal fuse to accurately detect an internal temperature of a housing, therefore preventing the household bean milk and bean curd makers from overheating.

The invention likewise includes household bean milk and bean curd makers having an overheat prevention device. The makers include a housing having a cavity to contain water therein, a main body provided on an upper portion of the housing to open or close the housing, a drive motor installed in a predetermined portion of the main body to generate rotating power when electricity is applied to the drive motor, a drive shaft to transmit the rotating power from the drive motor, and a cutting blade provided at an end of the drive shaft. A heater may be provided extending downwardly from the main body to generate heat when electricity is applied to the heater, thus heating an interior of the housing. A filter net may be detachably mounted to a predetermined portion of the main body to contain beans therein. The overheat prevention device includes a temperature sensing and fusing bar that extends to a predetermined length to reach a position around the filter net and has a temperature sensor to detect an internal temperature of the housing. A thermal fuse may be provided to cut off electricity supplied to the heater, when the interior of the housing overheats. The overheat prevention device allows the thermal fuse to accurately detect an internal temperature of the housing, therefore preventing the household bean milk and bean curd makers from overheating.

DETAILED DESCRIPTION OF THE INVENTION

Hereinafter, an embodiment of the present invention will be described in detail with reference to the attached drawings. The above and other objects, features and other advantages of the present invention will be more clearly understood from the following detailed description taken in conjunction with the accompanying drawings.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

Figure 2:
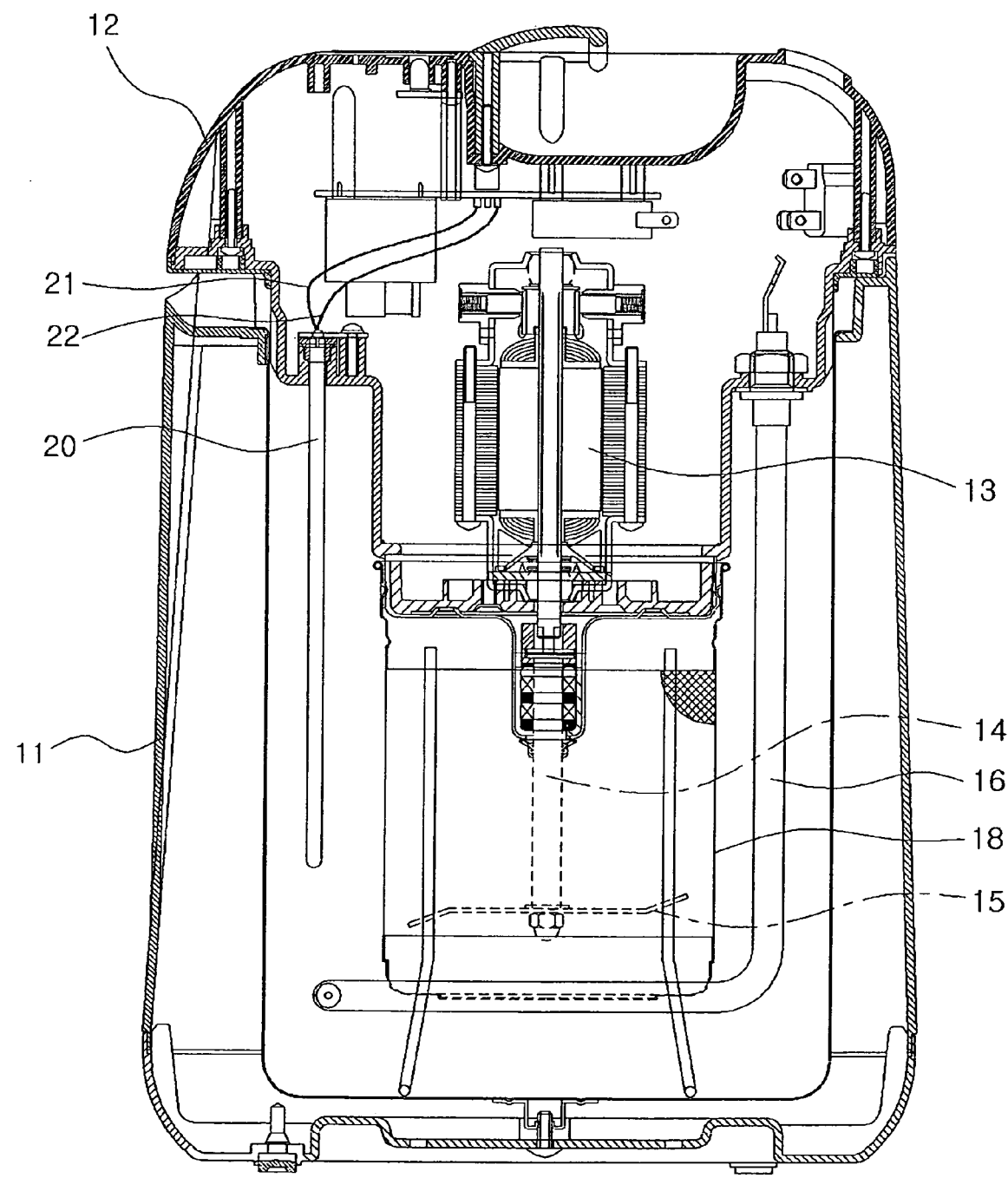
FIG. 2 is a view showing a construction of a household bean milk and bean curd maker with an overheat prevention device, according to an embodiment of the present invention.

An overheat prevention device for household bean milk and bean curd makers, according to an embodiment of the present invention is constructed as follows. As shown in FIG. 2, a household bean milk and bean curd maker includes a housing 11 which has a cavity to contain water therein. A main body 12 is provided on an upper portion of the housing 11 to open or close the housing 11, like a lid. A drive motor 13 is installed in a predetermined portion of the main body 12, and generates rotating power when electricity is applied to the drive motor 13. A drive shaft 14 transmits the rotating power from the drive motor 13. A cutting blade 15 is provided at an end of the drive shaft 14. A heater 16 downwardly extends from the main body 12, and generates heat when electricity is applied to the heater 16, thus heating an interior of the housing 11. A filter net 18 is detachably mounted to a predetermined portion of the main body 12, and contains beans therein.

Further, the household bean milk and bean curd maker also includes a thermal sensing and fusing bar 20 which extends to a predetermined length to reach a position around the filter net 18. the thermal sensing and fusing bar 20 includes a temperature sensor to detect an internal temperature of the housing 11, and a thermal fuse to cut off electricity supplied to the heater 16 when the interior of the housing is overheated. Further, the temperature sensing and fusing bar is a one-piece element, as shown in FIG. 2.

Figure 1:
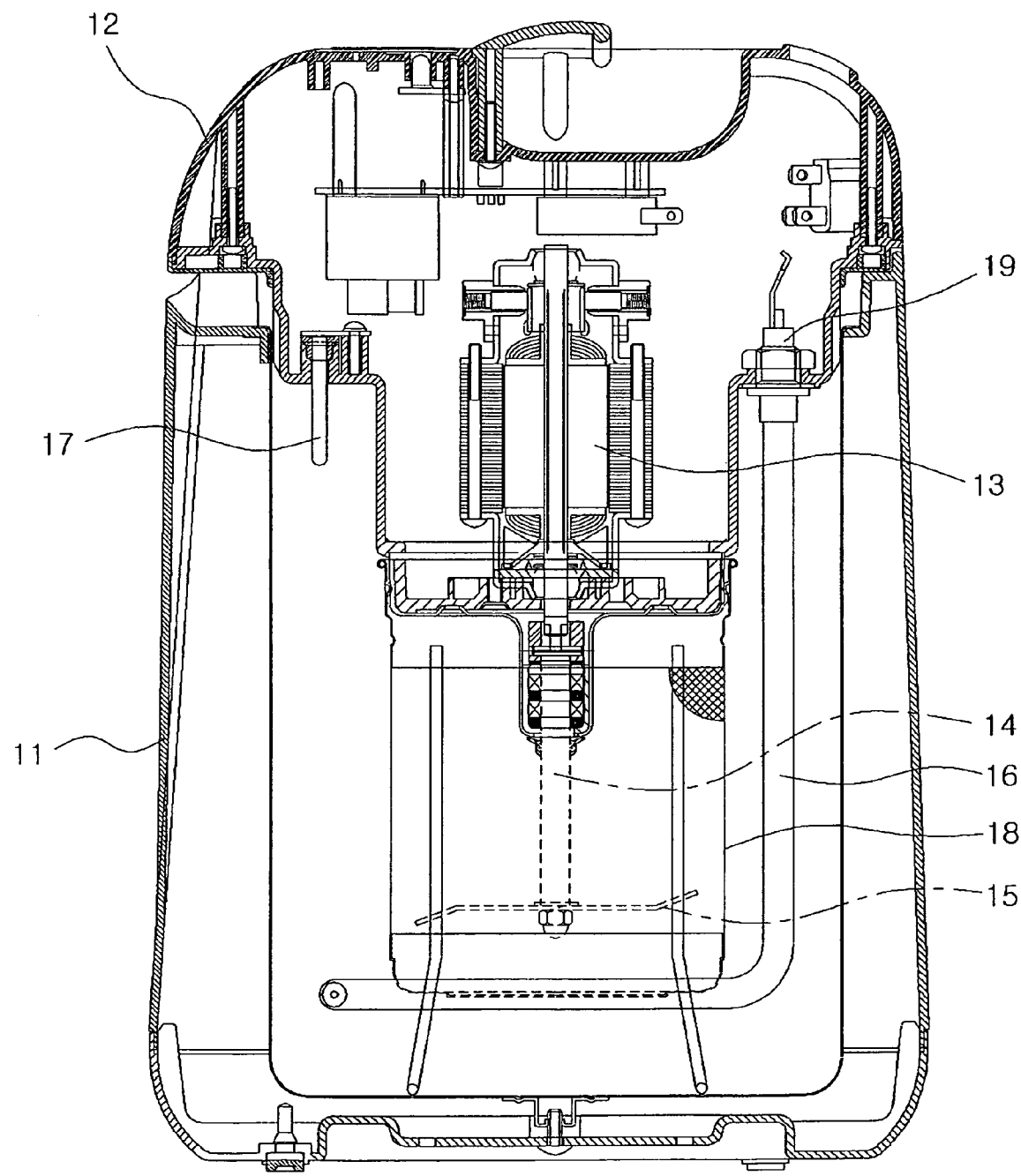
FIG. 1 is a view showing a construction of a prior art conventional household bean milk and bean curd maker.

Most of the elements of the household bean milk and bean curd maker according to the present invention are common with those of the conventional household bean milk and bean curd maker shown in FIG. 1. Those elements common to both the household bean milk and bean curd maker of the present invention and the conventional household bean milk and bean curd maker will thus carry the same reference numerals.

The operation of the overheat prevention device for the household bean milk and bean curd makers, according to the present invention, is as follows.

A user puts beans into the filter net 18. The filter net 18 having the beans is assembled with the main body 12, and then water is put into the housing 11. Thereafter, the main body 12 is placed on the upper portion of the housing 11 so that the filter net 18 is put into the housing 11.

Next, when a power switch (not shown) is turned on to apply electricity to the household bean milk and bean curd maker, a control unit (not shown) outputs a control signal to operate the heater 16, together with the temperature sensor connected to a temperature sensing line 21 of the temperature sensing and fusing bar 20. At this time, a primary heating process is executed while maintaining a predetermined temperature. Thereafter, as the drive motor 13 is operated, the beans contained in the filter net 18 are ground by the cutting blade 15 provided at the end of the drive shaft 14.

As such, while the beans are ground, the turbulence of water contained in the housing 11 is caused by rotation of the cutting blade 15. By the turbulence, bean grains which are finely ground by the cutting blade 15 come out of the filter net 18. Thus, the beans ground by the cutting blade 15 are divided into bean-curd dregs which remain in the filter net 18, and the extract of protein which flows out of the filter net 18.

Next, the control unit (not shown) outputs a control signal to operate the heater 16, together with a temperature sensor connected to the temperature sensing line 21 of the temperature sensing and fusing bar 20. At this time, a secondary heating process is executed while maintaining a predetermined temperature. Through the above-mentioned process, bean milk is obtained.

When the user desires to make bean curd, the user takes the heated extract of protein out of the housing 11. Next, the coagulant is added to the heated extract of protein so as to coagulate the extract of protein. Thereafter, the coagulated protein is pressed in a frame to produce the bean curd.

Further, the thermal fuse, serving as the overheat prevention device, is connected to a temperature fusing line 22 of the temperature sensing and fusing bar 20. Thus, when the housing 11 is overheated while making the bean milk and bean curd, the thermal fuse is electrically opened, thus preventing the electricity from being supplied to the heater 16, therefore ensuring the safety of a user.

The temperature sensing and fusing bar 20 extends to a position around the filter net 18 while being maximally lengthened to be near to the heater 16, thus being able to accurately detect whether the interior of the housing 11 is excessively heated or not. Of course, the length of the temperature sensing and fusing bar 20 is determined so that the temperature sensing and fusing bar 20 is not broken by the cutting blade 15.

As described above, the present invention provides an overheat prevention device for household bean milk and bean curd makers, which is constructed so that a thermal fuse is installed in a temperature sensing bar, and the temperature sensing bar is maximally lengthened to be near to a heater, thus allowing the thermal fuse to accurately detect an internal temperature of a housing, therefore preventing the household bean milk and bean curd maker from overheating.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. An overheat prevention device for household bean milk and bean curd makers, individually having a housing with a cavity to contain water therein, a main body provided on an upper portion of the housing to open and close the housing, a drive motor installed in a predetermined portion of the main body to generate rotating power when electricity is applied to the drive motor, a drive shaft to transmit the rotating power from the drive motor, a cutting blade provided at an end of the drive shaft, a heater extending downwardly from the main body to generate heat when electricity is applied to the heater, thus heating an interior of the housing, and a filter net detachably mounted to a predetermined portion of the main body to contain beans therein, the overheat prevention device, comprising:
   a) a temperature sensing and fusing bar, the temperature sensing and fusing bar being a one-piece element;
   b) the temperature sensing and fusing bar extending to a predetermined length to reach a position around the filter net;
   c) the temperature sensing and fusing bar extending substantially the length of the filter net;
   d) the temperature sensing and fusing bar including:
      i) a temperature sensor to detect an internal temperature of the housing; and
      ii) a thermal fuse to cut off electricity supplied to the heater, when the interior of the housing is overheated;
   e) the heater extending substantially the length of the filter net; and
   f) the temperature sensing and fusing bar extending near to the heater.

2. A household bean milk and bean curd maker, the bean milk and bean curd maker, comprising:
   a) a housing having an upper portion, a lower portion, and defining a cavity to contain water therein;
   b) a main body provided at an upper portion of the housing configured for opening and closing the housing;
   c) a drive motor provided in the main body for generating rotary power when electricity is applied to the drive motor, in use;
   d) a drive shaft provided for transmitting the rotary power from the drive motor;
   e) a cutting blade provided at an end of the drive shaft;
   f) a heater extending downwardly away from the upper portion of main body toward the lower portion, and the heater being configured for generating heat when electricity is applied to the heater, in use, thus heating an interior of the cavity of the housing;
   g) a filter net detachably mounted to the main body, the filter net configured for containing beans therein, in use; and
   h) an overheat prevention device provided in the interior of the cavity, the overheat prevention device including a temperature and sensing and fusing bar extending sufficiently to reach a position around the filter net, and the temperature sensing and fusing bar being a one-piece element;
   i) the temperature sensing and fusing bar including:
      1) a temperature sensor to detect an internal temperature of the housing; and
      2) a thermal fuse to cut off electricity supplied to the heater, when the temperature sensor has detected that an internal temperature of the interior of the housing is overheated, in use; and
   j) the temperature sensing and fusing bar extending substantially the length of the filter net.

3. A household bean milk and bean curd maker as in claim 2, wherein:
   a) the heater extends substantially the length of the filter net.

4. A household bean milk and bean curd maker as in claim 2, wherein:
   a) the temperature sensing and fusing bar extends near to the heater.

* * * * *